United States Patent Office 3,689,249
Patented Sept. 5, 1972

3,689,249
METHOD OF PELLETIZING USING COPPER-CONTAINING SILICEOUS WASTE MATERIALS
Leonard R. Judd, Copperhill, Tenn., assignor to Cities Service Company, New York, N.Y.
No Drawing. Filed May 26, 1971, Ser. No. 147,194
Int. Cl. C22b 1/14, 15/00
U.S. Cl. 75—3
6 Claims

ABSTRACT OF THE DISCLOSURE

Flotation mill tailings and copper furnace slags are combined with iron calcine to form fired iron pellets used in iron manufacture. These formerly discarded wastes are utilized, and iron, copper and zinc values present in the wastes can be recovered.

BACKGROUND OF THE INVENTION

Field of the invention

This invention relates to the recovery of metals from mill, furnace and refinery wastes. More particularly, it relates to a composition for the utilization of siliceous waste materials comprising flotation mill tailings and furnace slag.

Prior art

In the copper industry, a typical ore comprises the sulfides of iron, copper and zinc. The crushed ore undergoes a flotation process resulting in an iron concentrate, a copper concentrate, a zinc concentrate and flotation mill tailings. The flotation tailings are customarily discarded, since they are comprised mainly of clay, talc, mica, silica and other non-metallic minerals. The iron concentrate, typically, is roasted to give an iron oxide calcine containing traces of copper and zinc. Since this calcine is usually too small in particle size to be used in a blast furnace, it may be chloridized to remove "tramp elements," such as copper, zinc and lead, and pelletized to form pellets having desirable properties for use in the blast furnace. The iron oxide calcine from the roaster is sometimes deficient in the amount of silica needed to prevent catastrophic swelling in the blast furnace. To correct this deficiency, it is customary to add silica, such as beach sand, during the pelletizing process. Such added silica may also be useful as flux in blast furnace operations.

The copper concentrate undergoes various smelting steps, such as roasting and furnace smelting. The furnace is typically a reverbatory or electric furnace. The output of the copper furnace smelter comprises copper matte and furnace slag. The copper furnace slag, comprising from about 30 to about 50 wt. percent iron, about 20 to about 40 wt. percent silica, about 1 to about 4 wt. percent sulfur, about 2 to about 6 wt. percent zinc, about 0.1 to about 2 wt. percent copper, along with lesser amounts of other metals and substantial amounts of clay type materials, such as oxides of aluminum, magnesium, etc., has typically been discarded, due to the low concentration of valuable metals other than iron and the fact that the slag is considered too refractory for further processing. The iron content of such slag is largely tied up as silicates and is not readily recoverable. The term "copper furnace slag" includes slag from reverbatory or electric furnaces or from any other type smelting furnace used in the copper industry. It has not been the practice to recover the metal values from the slag, and the disposal of the unprocessed slag has resulted in unsightly dump heaps, along with pollution resulting from the leaching of these wastes by rain.

It is an object of this invention to utilize the siliceous wastes of the copper industry. It is also an object of this invention to recover metal values from the siliceous wastes. It is a further object of this invention to reduce pollution resulting from prior art procedures regarding the siliceous wastes.

SUMMARY

It has now been found that a portion of the siliceous waste materials produced in the mining and purification of copper can be utilized to produce a pelletized material suitable as a charge to an iron furnace. Concurrently, iron and other valuable metals can be recovered from the siliceous wastes, and pollution problems concerning the wastes are reduced. These benefits result from a process that involves mixing iron calcine and from about 1 to about 20 wt. percent of copper flotation mill tailings, copper furnace slag or mixtures thereof with a source of chloride ions, such as calcium chloride. The resultant mixture is pelletized, with the pellets thereafter being heated. The heating step dries the pellets, vaporizes a portion of the metallic chlorides therein and indurates the pellets, resulting in a material suitable as an iron furnace charge. The pellets are characterized as having a crushing strength of at least 400 pounds.

DESCRIPTION OF THE INVENTION

The siliceous copper refinery wastes used in this invention can come from a variety of sources, have different names and vary in analyses, depending on the refining process and the type of ore used. Flotation mill tailings typically contain from about 25 to about 50 wt. percent silica, from about 0.05 to about 1 wt. percent copper and from about 0.1 to about 1.5 wt. percent zinc, with the particle size varying from about 35 Tyler mesh (417 microns) to about one micron. Copper furnace slag can also vary in analysis, as previously noted, with an approximate analysis being: 25–45 wt. percent silica, 30–50 wt. percent iron, 0.3–2 wt. percent copper and 1–4 wt. percent zinc. This slag can be crushed or hydraulically granulated to a convenient size for use in the chloridizing and pelletizing steps, preferably to a particle sizes wherein at least about 40% of the particles pass through a 325 mesh screen. Although either the tailings or the slag or mixtures thereof can be used in this invention, the use of copper furnace slag is especially preferred.

The amount of siliceous waste materials used in the composition of this invention can range from about 1% to about 20 wt. percent, based on the weight of the total composition. Furnace slag is preferably used in amounts up to about 7 wt. percent while tailings are preferably used in amounts up to about 20 wt. percent. At the lower end of the range, the amount of siliceous material added has a minimal effect on the properties of the ultimate product, while at the upper end of the range, the amount of silica added tends to be in excess of that amount needed for optimum properties. Addition of excessive amounts of siliceous waste may result in production of iron pellets having a crush strength below the desired minimum of about 400 lbs.

The iron calcine used in this invention has the approximate composition of from about 50 to about 70 wt. percent iron, from about 1 to about 6 wt. percent silica, from about 0.05 to about 2 wt. percent copper, and from about 0.04 to about 2 wt. percent zinc. Although the iron calcine from a roasting process is typically destined as iron furnace feed, it differs from the usual iron ore that is the major source of iron and steel in that the former may contain small amounts of copper and zinc, while the latter often contains manganese and phosphorus. As it is recovered from the iron roaster, the calcine usually has a particle size of from about 10 mesh (1650 microns) to about one micron. Since this particle size is too small for use in a typical iron blast furnace, the calcine can be agglomerated by pelletizing or sintering, with pelletizing being preferred. Since the iron calcine is usually low in silica content and since silica is needed to prevent catastrophic swelling in the blast furnace as well as to provide acidic values and act as flux, silica values are added to the calcine. The silica values can come from any convenient source, such as beach sand or quartz. It has now been found that siliceous wastes, such as copper flotation mill tailings and copper furnace slags, formerly discarded to slag or tailings piles or used as road ballast, can furnish silica for this purpose. In addition, valuable metals, such as iron, copper and zinc, can be recovered therefrom. By utilizing such copper refinery waste materials, problems of pollution are also reduced.

The pelletizing procedure used in this invention is well-known. There are several methods of forming pellets, such as by adding water to a powdered mixture of iron calcine and siliceous waste materials so as to form a paste that can be pelleted. It is known that chloride ions, among other ions, can act to give the pellets sufficient strength to allow them to be heated, which process increases the strength. This process is disclosed in U.S. Pat. 2,888,341. It is also known that certain metal chlorides, such as sodium and magnesium chlorides, somehow react to produce pellets that have some deficient properties. Therefore, calcium and iron chlorides are the preferred chloride sources for pelletizing and chloridizing. The amount of chloride in the composition of this invention can vary from about 1 to about 15 wt. percent, with a preferable range being from about 3 to about 10 wt. percent, based on the total composition fed to the pelletizer.

The chloride value, such as calcium chloride, can be mixed with the iron calcine and siliceous copper waste materials in any convenient manner, such as adding the dry salt or by adding a brine. Since, by adding a brine to the dry mixture, good dispersal of the chloride into the mix can be obtained, as well as offering a source of water, this method is preferred. As is well known, a desirable moisture content of the paste to be pelletized is from about 6 to about 13 wt. percent, with a preferred range of from about 9 to about 11 wt. percent. The pellets can be formed in any known manner, such as by a pelletizing disc. The wet pellets can be dried to a moisture content of preferably not over about 0.5 wt. percent and then indurated in a kiln, according to known technology. In the induration step, the volatile chlorides, such as copper and zinc chlorides, can be removed from the pellets, and the crushing strength of the pellets is improved. Broadly, at a temperature of about 800° C., decomposition of the chloride source occurs, with the volatile metal chlorides being vaporized and removed at a temperature of from about 900° C. to about 1100° C. High temperature firing of the pellets, to increase the strength, takes place at a temperature range of about 1200–1250° C. This induration process can take place in any convenient apparatus, such as a shaft kiln or rotary kiln, with a rotary kiln being preferred.

The volatilized metal chlorides can be recovered, and the iron pellets can serve as charge to a blast furnace.

The composition of this invention differs from other compositions used in iron manufacturing in that (1) the major iron source (iron calcine in the invention) contains metals such as copper and zinc, while other iron sources often contain appreciable quantities of manganese and phosphorus and (2) at least a portion of the silica and iron values used are obtained from siliceous copper refinery wastes such as copper flotation mill tailings and copper furnace slag.

In accordance with one embodiment of the invention, iron calcine, having a particle size of from about 65 Tyler mesh to submicron size and comprising from about 55 to about 65 wt. percent iron, from about 1 to about 5 wt. percent silica, from about 0.05 to about 1.5 wt. percent copper, and from about 0.06 to about 1.6 wt. percent zinc, is mixed with copper furnace slag. The furnace slag, desirably ground to provide a particle size wherein at least about 40 wt. percent of the particles pass through a 325 mesh screen, typically comprises from about 35 to about 45 wt. percent iron, from about 25 to about 45 wt. percent silica, from about 2.5 to about 5 wt. percent zinc and from about 0.2 to about 1.8 wt. percent copper. The amount of furnace slag can vary from about 1 to about 20 wt. percent, based on the ultimate pelletized mixture, preferably from about 2 to about 17 wt. percent. To this mixture of iron calcine and siliceous wastes is added from about 1 to about 15 wt. percent, preferably from about 3 to about 10 wt. percent, of a source of chloride ions, preferably calcium chloride. In a preferred method of addition, a calcium chloride solution is thoroughly mixed, in any conventional apparatus, with the calcine-siliceous waste material such that the resultant mixture has a water content of from about 6 to about 13 wt. percent, preferably from about 9 to about 11 wt. percent. The resultant mixture is fed to a pelletizing disc, forming pellets of from about ¼" to about 1" in the major dimension, preferably about ½". The wet pellets are then dried to a moisture content of not more than about 0.5 wt. percent water at a temperature of not more than about 250° C. The pellets are then charged to a kiln and heated according to known technology, for example, at a temperature of from about 900° to about 1100° C. for a period of time necessary to decompose the chloride source and to volatilize and remove metal chlorides such as zinc chloride and copper chloride. The volatilized metal chlorides are recovered by any convenient means, such as water entrainment. The pellets are then indurated by heating at a temperature of from about 1200 to about 1250° C., thereby increasing the crush strength to a desirable degree. The pellets thus produced are suitable charge to a blast furnace.

EXAMPLE I

This example shows that varying amounts of copper furnace slag can be combined with iron calcine to produce indurated pellets having an acceptable crushing strength.

A mixture of finely ground (85% passing through a 325 mesh screen) iron calcine was used, the mixture analyzing:

| | Percent |
|---|---|
| Total silica | 2.3 |
| Copper | 0.1 |
| Zinc | 0.2 |
| Iron | 66.2 |
| Remainder | 31.2 |

Varying amounts of ground furnace slag were added to the iron calcine, as indicated in Table I. The furnace slag used had the following composition:

| | Percent |
|---|---|
| Total silica | 35 |
| Copper | 1.7 |
| Zinc | 3.3 |
| Iron | 40 |
| Remainder | 20 |

The slag was ground to 40% −325 mesh. Calcium chloride in the form of a concentrated aqueous solution was added to this mixture to provide a 3.5% by weight calcium chloride content. The components were mixed, and, after thorough mixing, the material was added to a pelletizing disc in small amounts to allow pellet growth. The pellets, about one-half inch in size, were oven dried at about 230° C. to a moisture content of between 0 and 3% by weight. Thereafter the pellets were indurated in a high temperature electric furnace at a temperature of about 1250° C. for about 90 minutes. A current of air was added to this mixture to provide a 3.5% by weight liter per minute. The air was preheated by passing it previously through a heater. Crush strengths are reported as the load in pounds to break a one-half inch pellet. The results are summarized in Table I below.

TABLE I

| Run | Percent furnace slag in mix | SiO₂ in mix (percent) | Crush strength (lbs.) |
|---|---|---|---|
| A | 1.61 | 2.8 | 1,180 |
| B | 3.23 | 3.4 | 722 |
| C | 4.84 | 3.9 | 535 |
| D | 6.45 | 4.4 | 476 |

EXAMPLE II

The procedure described in Example I was followed, except that in this example flotation mill tailings having the following characteristics were employed.

| | Percent |
|---|---|
| Total silica | 39 |
| Copper | 0.1 |
| Zinc | 0.4 |
| Iron | 7 |
| Remainder | 53.5 |

The mill tailings had a fineness such that 45% of the particles passed through a 325 mesh screen. The results are summarized below in Table II.

TABLE II

| Run | Percent tailings in mix | SiO₂ in mix (percent) | Crush strength (lbs.) |
|---|---|---|---|
| E | 1.28 | 2.8 | 1,570 |
| F | 2.56 | 3.2 | 835 |
| G | 3.57 | 3.6 | 625 |
| H | 3.84 | 3.7 | 630 |
| J | 5.13 | 4.2 | 940 |
| K | 7.15 | 4.9 | 700 |
| L | 7.69 | 5.1 | 920 |
| M | 10.72 | 6.2 | 980 |
| N | 14.28 | 7.5 | 740 |
| O | 21.43 | 10.2 | 770 |

This invention allows the recovery of much of the valuable copper and zinc formerly discarded in the siliceous wastes. Using the procedures and compositions of Examples I and II, the removal and recovery of these metals is shown below:

TABLE III

| Run | Feed mix analysis | | Fired pellet analysis | | |
|---|---|---|---|---|---|
| | Percent Cu | Percent Zn | Percent Cu | Percent Zn | Percent Fe |
| A | .17 | .29 | .03 | .03 | 64.9 |
| B | .18 | .34 | .02 | .03 | 65.4 |
| C | .19 | .39 | .02 | .04 | 65.4 |
| D | .20 | .44 | .04 | .07 | 64.7 |
| E | .16 | .24 | .02 | .03 | 63.3 |
| F | .16 | .24 | .02 | .03 | 64.9 |
| G | .16 | .25 | .04 | .04 | 64.8 |
| H | .16 | .25 | .03 | .04 | 64.2 |
| J | .16 | .25 | .02 | .03 | 64.0 |
| K | .16 | .25 | .03 | .04 | 62.6 |
| L | .16 | .25 | .02 | .03 | 62.9 |
| M | .16 | .25 | .04 | .04 | 61.6 |
| N | .16 | .26 | .03 | .04 | 59.6 |
| O | .15 | .27 | .04 | .05 | 58.5 |

From the above data, it can be seen that elimination of more than 80% of copper and zinc were realized for recovery in subsequent processing.

From the foregoing it is apparent that substantial amounts of furnace slag or mill tailings or mixtures thereof can be added to iron calcine to result in a product having acceptable properties, while at the same time recovering substantial quantities of valuable zinc and copper.

Although various embodiments of the present invention have been described, it will be appreciated by those skilled in the art that various changes and modification can be made without departing from the scope of the invention.

Therefore I claim:

1. A method of utilizing siliceous waste materials produced in the mining and purification of copper to produce a pelletized material suitable as an iron blast furnace charge and recovering valuable materials therefrom which comprises:
   (a) mixing iron calcine and from 1 to about 20 percent by weight of copper flotation mill tailings, copper furnace slag or mixtures thereof with a source of chloride ions;
   (b) pelletizing the resulting mixture, and
   (c) thereafter heating the mixture to dry the pellets, vaporize metallic chlorides and indurate the pellets.

2. The method of claim 1 in which the siliceous waste is copper furnace slag and is used in amounts between about 1 and about 7 wt. percent of the total mixture.

3. The method of claim 2 in which the source of chloride ions is calcium chloride, and is included in the mixture in amounts between about 1 and about 15 wt. percent.

4. The method of claim 1 which also includes recovering metallic chlorides from the process.

5. A composition for the utilization, by pelletizing and chlorodizing, of siliceous copper refinery waste materials comprising:
   (a) from about 1 to about 20 wt. percent of a material selected from the group consisting of copper flotation mill tailings, copper furnace slag and mixtures thereof;
   (b) from about 1 to about 15 wt. percent of a source of chloride ions, and
   (c) iron calcine.

6. A composition according to claim 5 wherein the source of chloride ions is calcium chloride.

References Cited

UNITED STATES PATENTS

| 1,360,666 | 11/1920 | Mills | 75—2 |
| 1,368,885 | 2/1921 | Bradford | 75—113 |
| 2,653,905 | 9/1953 | Aannerud | 75—117 X |
| 3,303,021 | 2/1967 | Roberts | 75—117 X |
| 3,318,685 | 5/1967 | Handwerk | 75—3 |

FOREIGN PATENTS

| 813,293 | 5/1959 | Great Britain | 75—113 |

ALLEN B. CURTIS, Primary Examiner

U.S. Cl. X.R.

75—113, 117